United States Patent

Larson et al.

[11] Patent Number: 6,086,132
[45] Date of Patent: Jul. 11, 2000

[54] SUN SPOT

[76] Inventors: Richard E. Larson, 55 S. Smith St.; David N. Caldwell, 409 NW. Highway #3, both of Palatine, Ill. 60067

[21] Appl. No.: 09/115,986

[22] Filed: Jul. 15, 1998

[51] Int. Cl.[7] .......................................................... B60J 3/00
[52] U.S. Cl. .......................................... 296/97.6; 296/97.9
[58] Field of Search .................................. 296/97.6, 97.2, 296/97.1, 97.9

[56] References Cited

U.S. PATENT DOCUMENTS

| | | |
|---|---|---|
| D. 274,235 | 6/1984 | Fitzpatrick . |
| 2,824,763 | 2/1958 | Extrom .................................. 296/97.6 |
| 3,415,569 | 12/1968 | Leevo . |
| 3,515,427 | 6/1970 | Van Sickle ............................. 296/97.6 |
| 3,522,968 | 8/1970 | Honor, Sr. . |
| 3,858,931 | 1/1975 | Van Sickle . |
| 3,961,820 | 6/1976 | Spangler . |
| 4,090,733 | 5/1978 | Altschul . |
| 4,317,589 | 3/1982 | Kuss . |
| 4,330,148 | 5/1982 | LaMont ................................. 296/97.6 |
| 4,353,593 | 10/1982 | Henson . |
| 4,921,296 | 5/1990 | Gruber ................................. 296/97.2 |
| 4,982,992 | 1/1991 | Vu et al. . |
| 5,044,685 | 9/1991 | Yang . |
| 5,513,892 | 5/1996 | Thomas ................................. 296/97.2 |

FOREIGN PATENT DOCUMENTS

| | | | |
|---|---|---|---|
| 0147720 | 8/1952 | Australia ............................... 296/97.2 |
| 2498997 | 8/1982 | France .................................. 296/97.6 |
| 328554 | 4/1930 | United Kingdom ................... 296/97.2 |

Primary Examiner—Joseph D. Pape
Attorney, Agent, or Firm—Meroni & Meroni; Charles F. Meroni, Jr

[57] ABSTRACT

This invention concerns, a sun spot for use as an extension on a vehicle visor of a vehicle where the vehicle visor has a peripheral edge and the vehicle has an interior roof surface and a windshield. The sun spot comprises: a resiliently flexible injection molded shield member of unibody construction having a clip mechanism for adjusting and removing placement of the sun spot along the peripheral edge of the vehicle visor in approximate alignment with a longitudinal axis of the resiliently flexible injection molded shield member. The resiliently flexible injection molded shield member is sized and proportioned for shielding glare without impairing visibility through the windshield and the resiliently flexible injection molded shield member is retainable on the vehicle visor while flexing for comforming with the placement of the vehicle visor against the interior roof surface or the windshield. The resiliently flexible injection molded shield member is constructed for performing under temperature variations without materially failing.

21 Claims, 4 Drawing Sheets

SUN SPOT

BACKGROUND OF THE INVENTION

1. Field of the Invention

The present invention relates to vehicle visors. More specifically, the invention is primarily intended for use as an extension removably attachable to a vehicle visor for shielding glare without impairing visibility through a windshield of a vehicle.

2. Description of the Prior Art

In the art of vehicle visor extensions it has been found that standard vehicle visors on automobiles, trucks, and the like do not always effectively shield light and sunshine when the light or sunshine shines low upon the horizon, as at dawn and dusk, and directly into the driver's line of sight. The light or sunshine therefore creates a hazardous condition for the driver and those upon the roadways.

The state of the art is such that sun visor attachments and the like have been developed with the object of solving this hazardous condition. For example, U.S. Pat. No. 3,415,569 discloses a Sun Visor Attachment which is secured to a conventional car visor by a wingnut or a bracket and which is rotated downwards to cover the glare of sunshine. This device, however does not disclose a resilient flexible shield capable of conforming to placement with the visor against the windshield or the interior car roof.

U.S. Pat. No. 3,522,968 discloses a Glare Shield Attachment which requires a long, narrow strip fastened to a lower edge of the visor with a U-shaped clip which grips upper and lower edges of the strip and slidably mounts upon the strip to hingedly support the glare shield. This device therefore requires additional modifications to the vehicle visor and does not disclose any flexibility properties of the glare shield.

Furthermore, U.S. Pat. No. 3,961,820 discloses an Adjustable Sun Shield which comprises a tinted translucent sheet which has a reinforcing rib extending along the upper edge and which is supported from the visor by a pair of supporting arms which are pivotably secured to the reinforcing rib and which are adapted to secure the sun screen to the visor. Again, a flexible shield is not disclosed. Finally, a Clip for a Flat Sun Visor is disclosed in U.S. Pat. No. 4,982,992 wherein a pair of alligator clips having pivot pins are used to attach the shield to the visor. The pivot pins allows the shield to rotate into an upward storage position and a downward intercepting position. This device does not disclose a flexible shield.

What is needed then is a glare shield that is removably attachable to a vehicle visor at any desired point along a peripheral edge of the vehicle visor to block out the sunshine or light that enters below the extended or downward extended vehicle visor. The glare shield should be flexible and capable of remaining attached to the vehicle visor when pushed up against either the windshield or the interior roof surface and the glare shield should be capable of performing under the varied temperature conditions existent in a vehicle without materially failing.

Accordingly, it is a principal object of our invention to provide a simple, lightweight sun spot for use as a removably attachable extension on a vehicle visor.

It is a further object of our invention to provide a sun spot having a resiliently flexible construction capable of performing under varied temperature conditions without materially failing.

It is a still further object of our invention to provide a sun spot capable of flexibly conforming to interior roof surface or the windshield of the vehicle when the vehicle visor is placed against the interior roof surface or the windshield respectively.

It is a further object of invention to provide a sun spot constructed of an opaque material, a transparent material coated with a glare reducing agent, or a hybrid construction of opaque material and transparent or translucent material coated with a glare reducing agent.

Other objects of my invention, as well as particular features, elements, and advantages thereof, will be elucidated in, or apparent from, the following description and the accompanying drawing figures.

SUMMARY OF THE INVENTION

According to my present invention we have provided in combination, a sun spot for vehicle having an interior roof surface and a windshield, the combination comprising: a vehicle visor having a peripheral edge and being connected to the vehicle; and a resiliently flexible injection molded shield member of unibody construction having clip means for adjustably removable placement along the peripheral edge of the vehicle visor in approximate alignment with a longitudinal axis of the resiliently flexible injection molded shield member, the resiliently flexible injection molded shield member being sized and proportioned to shield glare without impairing visibility through the windshield, the resiliently flexible injection molded shield member being retainable on the vehicle visor while flexing to conform with the placement of the vehicle visor against the interior roof surface or the windshield, the resiliently flexible injection molded shield member constructed for performing under temperature variations without materially failing.

In another embodiment we have provided a sun spot for use as an extension on a vehicle visor of a vehicle having a peripheral visor edge and for use with an interior vehicle roof surface and a windshield, the sun spot comprising: a single-piece resiliently flexible synthetic shield member constructed for performing without materially failing and being sized and proportioned to shield glare under temperature variations without impairing visibility through the windshield, the single-piece resiliently flexible synthetic shield member having clip means for adjustably and removably placing the single-piece resiliently flexible synthetic shield member along the peripheral visor edge of the vehicle visor in approximate alignment with a longitudinal axis of the single-piece resiliently flexible synthetic shield member, the single-piece resiliently flexible synthetic shield member being flexible for conforming to the interior vehicle roof surface or the windshield when the vehicle visor is placed against the interior vehicle roof surface or the windshield respectively; and spring means attached to the clip means for causing the clip means to retain the single-piece resiliently flexible synthetic shield member on the vehicle visor before, during, and after usage of the vehicle visor and the single-piece resiliently flexible shield member, the clip means being structurally configured to be optionally connectable and detachable to the vehicle visor as required.

In another embodiment we have provided a sun spot for use as an extension on a vehicle visor of a vehicle, the vehicle having a peripheral edge, the vehicle having an interior roof surface and a windshield, the improvement comprising: a single-piece resiliently flexible synthetic shield member constructed for performing without materially failing and being sized and proportioned to shield glare under temperature variations without impairing visibility through the windshield, the single-piece resiliently flexible synthetic shield member having clip means for adjustably and removably placing the single-piece resiliently flexible synthetic shield member along the peripheral edge of the vehicle visor in approximate alignment with a longitudinal axis of the single-piece resiliently flexible synthetic shield member, the single-piece resiliently flexible synthetic shield member being constructed as one piece with the clip means, the clip means being structurally configured to be optionally releasably securable to the vehicle visor as required, the single-piece resiliently flexible synthetic shield member being flexible for conforming to the interior roof surface or the windshield when the vehicle visor is placed against the interior roof surface or the windshield respectively; and spring means attached to the clip means, the spring means being configured to cause the clip means to retain the single-piece resiliently flexible synthetic shield member on the vehicle visor before, during, and after usage of the vehicle visor and the single-piece resiliently flexible shield member.

Finally, in further embodiment we have provided, a sun spot for use as an extension on a vehicle visor of a vehicle, the vehicle visor having a peripheral edge, the vehicle having an interior roof surface and a windshield, the sun spot comprising: a single-piece resiliently flexible injection molded shield member constructed for performing without materially failing and being sized, proportioned, and geometrically shaped to shield glare under temperature variations ranging from −30° F. to +130° F. without impairing visibility through the windshield, the single-piece resiliently flexible injection molded shield member having clip means for adjustably and removably placing the single-piece resiliently flexible injection molded shield member along the peripheral edge of the vehicle visor in approximate alignment with a longitudinal axis of the single-piece resiliently flexible injection molded shield member; and spring means attached to the clip means for retaining the single-piece resiliently flexible injection molded shield member on the vehicle visor before, during, and after usage of the vehicle visor and the single-piece resiliently flexible injection molded shield member, the single-piece resiliently flexible injection molded shield member flexibly conforming to placement against the interior roof surface or the windshield when the vehicle visor is placed against the interior roof surface or the windshield respectively.

DESCRIPTION OF THE DRAWINGS

Other features of our invention will become more evident from a consideration of the following detailed description of my patent drawings, as follows.

DETAILED DESCRIPTION OF THE PREFERRED EMBODIMENT

Referring now to the drawings, our invention provides in combination, a sun spot 10 for use as an extension on a vehicle visor 12 of a vehicle 14 (FIG. 12) as shown in FIGS. 3, 9, 10–12. The vehicle visor has a peripheral edge 16, or peripheral visor edge in other embodiments, and the vehicle has an interior roof surface 18, or interior vehicle roof surface in other embodiments, and a windshield 20. At periods of time, such as a dawn and at dusk, sunlight or light will appear on the horizon and will create a hazard for a driver (not shown) of the vehicle despite the use of the vehicle visor. It is for this reason that the sun spot is used to shield the glare that enters the driver's line of sight below the downwardly extended vehicle visor (see FIG. 12).

In one embodiment of our invention, as shown in FIGS. 1–4, the combination comprises: a resiliently flexible injection molded shield member 22 of unibody construction having clip means 24 for adjustably removable placement along the peripheral edge 16 of the vehicle visor 12 in approximate alignment with a longitudinal axis 26 of the resiliently flexible injection molded shield member 22. In another embodiment, as shown in FIGS. 5–9, a single-piece resiliently flexible injection molded shield member 28, or single-piece resiliently flexible shield member in other embodiments, has clip means 30 and uses a spring means 32 attached to the clip means 30 as described below. The clip means is structurally configured to be connectable and detachable to the vehicle visor as required. In other embodiments the single-piece resiliently flexible injection molded shield member is constructed from a synthetic injection molded process. The sun spot 10 is also constructed of lightweight construction as further described below.

Figure 3:
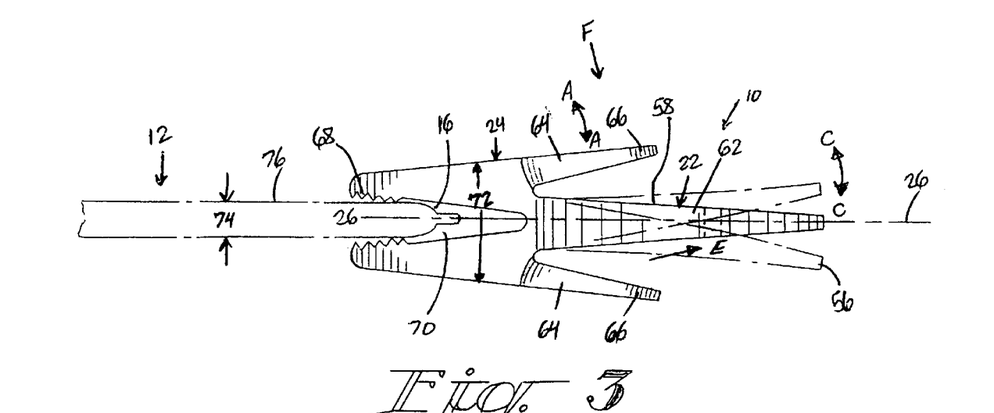
FIG. 3 is a side view of the first embodiment of FIG. 1 showing the attachment of the sun spot to a vehicle visor and the flexibility of a resiliently flexible injection molded shield member of the sun spot.
Figure 4:
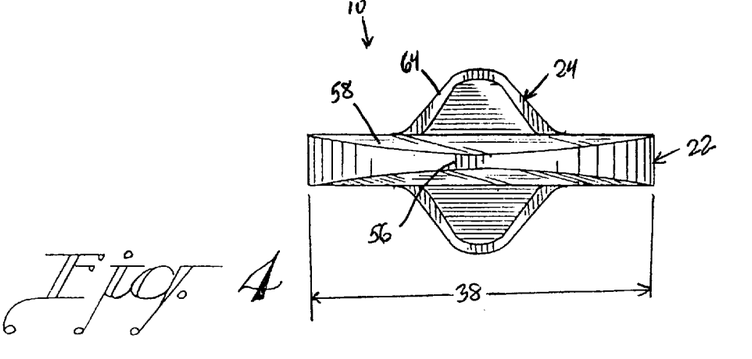
FIG. 4 is an end view of the first embodiment of FIG. 1 looking along a horizontal axis at a lower edge.
Figure 9:
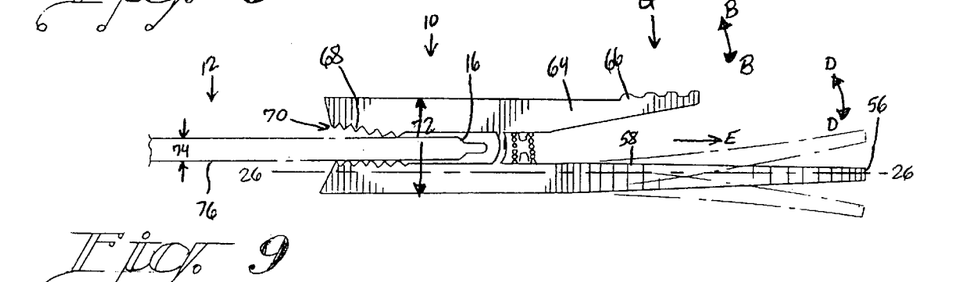
FIG. 9 is a side view of the second embodiment of FIG. 5 showing the attachment of the sun spot to a vehicle visor and the flexibility of a single-piece resiliently flexible injection molded shield member of the sun spot.
Figure 12:
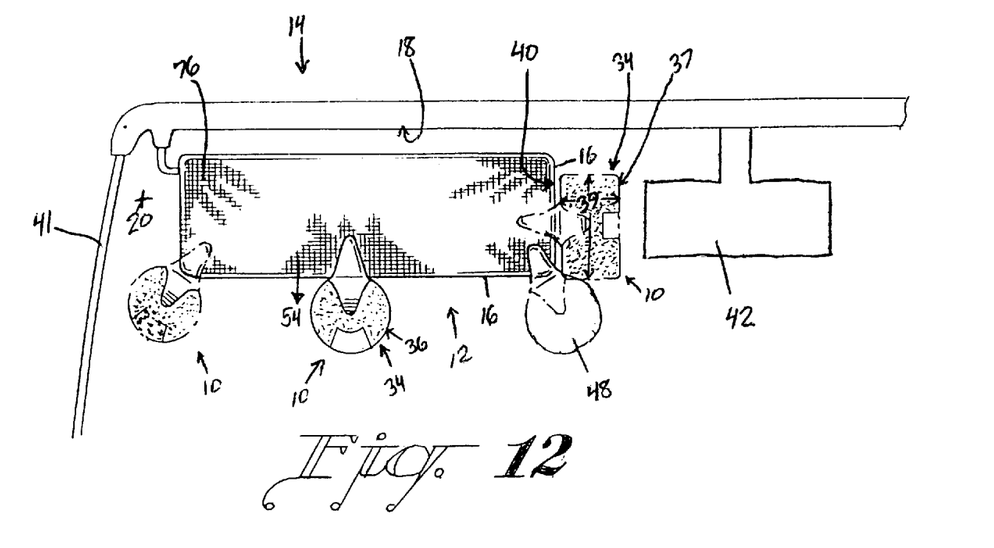
FIG. 12 is a top view of the vehicle visor in extended position showing the various placements of the sun spot along a peripheral edge of the vehicle visor.

The ability to adjustably removably place the sun spot 10 along the peripheral edge 16, as shown in FIG. 12, allows the driver or user (not shown) to easily, efficiently, and firmly place the sun spot in the path of direct sunlight, light, reflection and so forth simply by clipping or unclipping the sun spot, as shown by arrows A—A in FIG. 3 and arrows B—B in FIG. 9. The sun spot is also tailored to clip onto vehicle visors 12 of varying thicknesses, as will be described below and henceforth has application to automobiles, trucks, and the like.

As shown in FIG. 12, the resiliently flexible injection molded shield member 22, 28 is sized and proportioned to shield glare without impairing visibility through the windshield 20 (looking into the plane of the paper). It is contemplated that the resiliently flexible injection molded shield member could be constructed of a injection molded plastic, such as a synthetic polymer material or hydrocarbon-based substance known in the art. It is critical, however, that the material chosen have the properties heretofore discussed.

Hence, the sun spot 10 works to shield only the hazardous glare of the sunlight, light, or reflections and yet is sized so as not to impair visibility through the windshield.

To accomplish this important feature, the resiliently flexible injection molded shield member 22, 28 has a geometrical shape 34, such as circular 36 or rectangular 37 for example, as shown in FIG. 12, and a diameter 38 (FIGS. 4 and 8) or a dimension 39 sized to block only the glare directed towards the driver's line of sight (into the plane of the paper), as shown in FIGS. 1,2, 6, and 12, and not to block the areas below the vehicle visor 12 where the glare is not directed towards the driver's line of sight. The circular shape 36, or disk shape, is preferable when blocking out the sun itself, though it is not intended that the geometrical shape be limited to either named shape. What is critical is that the geometrical shape is shaped and proportioned to shield the glare passing around the peripheral edge 16 of the vehicle visor 12.

As shown in FIG. 12, a rectangular geometrical shape 37 can be used along a vertical side 40 of the vehicle visor 12 to shield glare between the visor and vehicle door 41 or visor and rear-view mirror 42. In the preferred embodiment, the diameter 38 of the circular 36 geometrically shaped resiliently flexible injection molded shield member 22, 28 is 2¼ inches to 5 inches. The preferred dimension 39 of the rectangular 37 geometrically shaped resiliently flexible injection molded shield member is 1½ inches by 3 inches.

Figure 1:
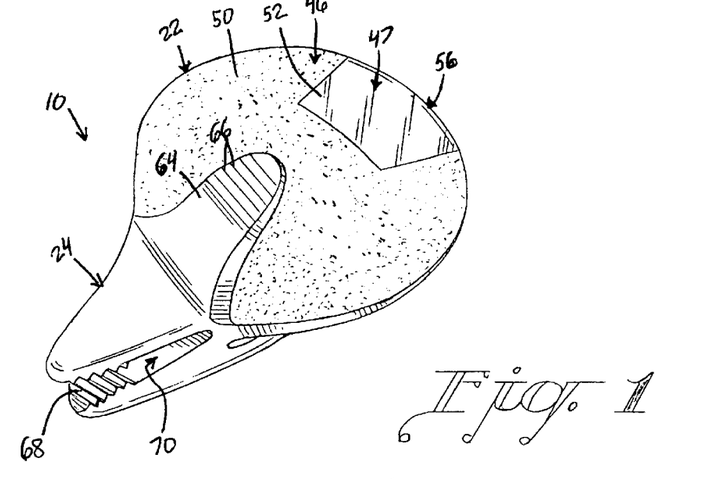
FIG. 1 is a perspective view of a first embodiment of our invention, a sun spot.
Figure 2:
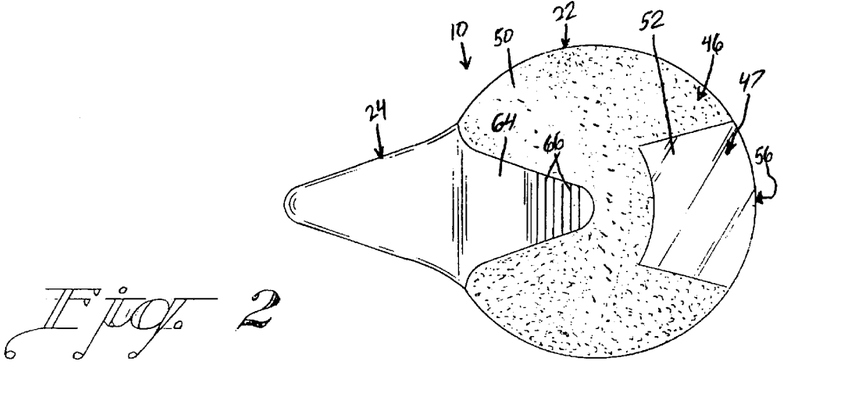
FIG. 2 is a top view of the first embodiment of FIG. 1.
Figure 5:
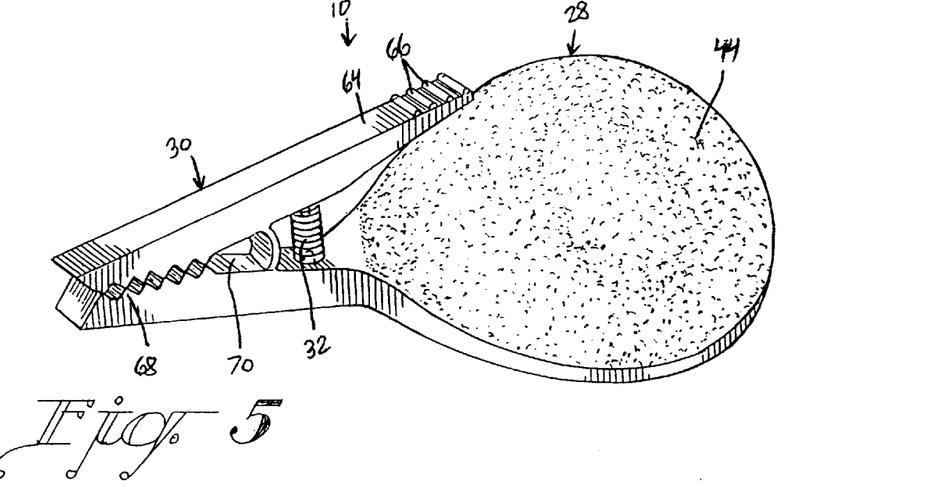
FIG. 5 is perspective view of a second embodiment of our invention employing spring means.
Figure 6:
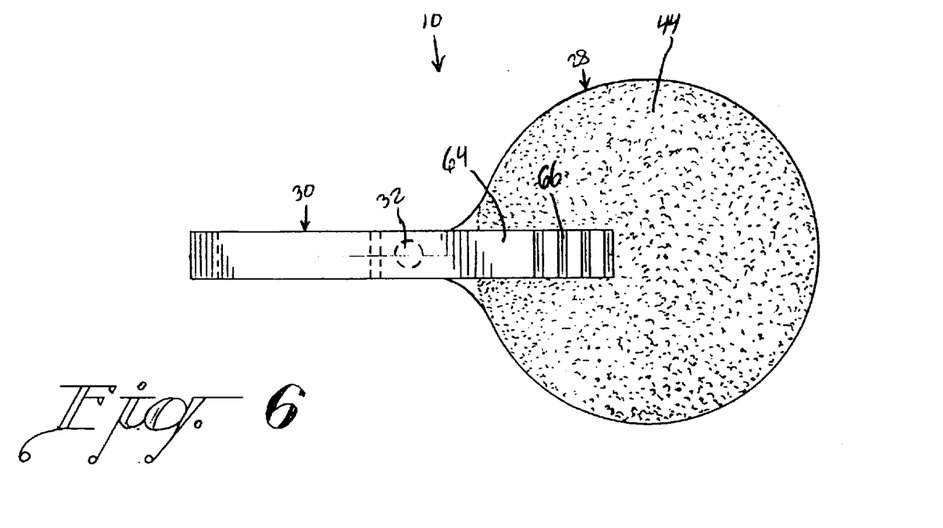
FIG. 6 is a top view of the second embodiment of FIG. 5.
Figure 7:
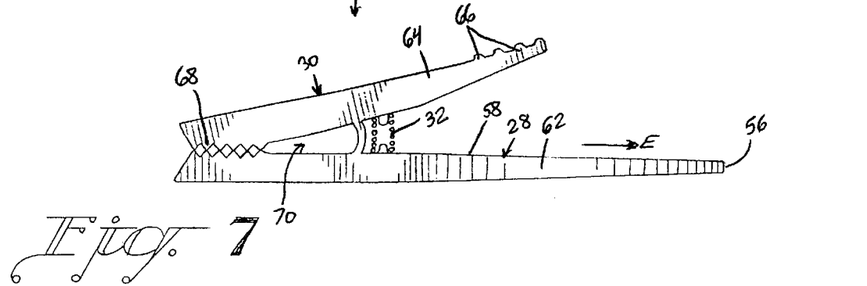
FIG. 7 is a side view of the second embodiment of FIG. 5.
Figure 8:
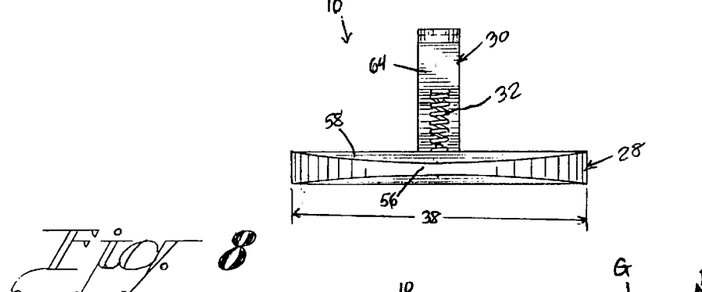
FIG. 8 is an end view of the second embodiment of FIG. 5 looking along a horizontal axis at a lower edge.

Another important feature of the sun spot 10 that acts to shield glare without impairing the driver's, or user's, (not shown) visibility is that the resiliently flexible injection molded shield member 22, 28 can be constructed of an opaque material 44, as shown in FIGS. 5 and 6, a hybrid construction 46 of opaque material and either transparent material 47 coated with a glare reducing agent (not shown) or translucent material 47 coated with a glare reducing agent, as shown in FIGS. 1–2, or a transparent material 48 coated with a glare reducing agent, as shown in FIG. 12.

For safety purposes, the use of either the hybrid construction 46 or the transparent material 48 coated with a glare reducing agent allows the driver (not shown) to view through the sun spot 10 while still shielding the glare of the sunlight and so forth. When a sun spot using the opaque material 44 is to be used the sun spot can be sized and shaped to shield only the glare without impairing the driver's, or user's, vision through the windshield 20.

It is contemplated that the glare reducing agent (not shown) can be a material, such as "Blue Blockers"™, or any material used by those skilled in the art to reduce the glare of sunlight, light, and so forth seen by a person. A key reason for using the glare reducing agent is to block out any harmful ultraviolet rays and to shield the glare. A tint (not shown) or tinting, such as blue, green, yellow, mirrored, and so forth can also be applied to the translucent material 47 or the transparent material 47, 48 so as to accomplish the same purposes. The agent could be applied by a chemical spraying process, by application of a resin, and so forth, though it is not intended that the tinting and glare reducing agents be limited to said constructions and materials.

To create the hybrid construction 46, as shown in FIGS. 1–2, and 12, the resiliently flexible injection molded shield member 22, 28 further comprises an upper portion 50 and a lower portion 52. The upper portion extends from the clip means 24, 30 towards a lower edge 56 and the lower portion is located adjacent the upper portion and includes the lower edge. The upper portion is constructed of the opaque material 44 and the lower portion is constructed of the translucent material 47 coated with a glare reducing agent or the transparent material 47 coated with a glare reducing agent.

In constructing the hybrid construction 46 it is contemplated that the opaque material 44 will be injection molded, or even extruded, by processes known in the art together with the transparent or translucent materials 47 placed within the molding or extrusion. The lower portion 52 could then be cut away to reveal the transparent or translucent material. In the alternative, the transparent or translucent material could be added to the lower portion after the injection molded process by processes known in the art. It is contemplated that the transparent and translucent materials will be those materials known in the art, such as plastics. In addition, in the preferred embodiment, the upper portion 50 will represent two-thirds of the resiliently flexible injection molded shield member 22, 28 and the lower portion 52 will represent the remaining one-third of the resiliently flexible injection molded shield member. However, any proportion or placement, such as the "pie-shaped" section shown in FIGS. 1,2, and 12, could be used as long as the glare is shielded and the visibility through the sun spot 10 is not impaired.

Figure 10:
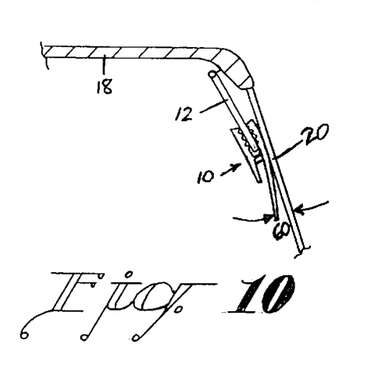
FIG. 10 is a side sectional view of the second embodiment of FIG. 5 attached to the vehicle visor and flexibly conforming to a windshield of a vehicle.
Figure 11:
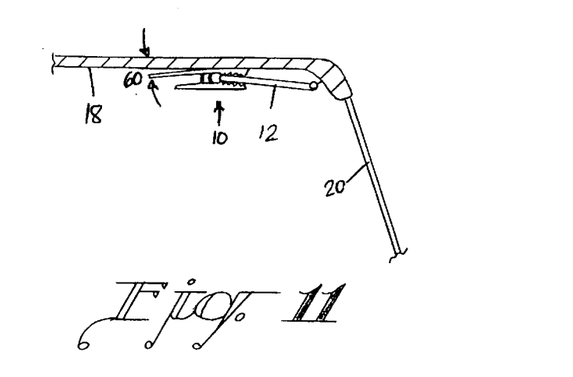
FIG. 11 is a side sectional view of the second embodiment of FIG. 5 attached to the vehicle visor and flexibly conforming to an interior roof surface of the vehicle.

Another critical feature of the resiliently flexible injection molded shield member 22, 28 is that the resiliently flexible injection molded shield member must be retainable on the vehicle visor 12 while flexing, as shown by arrows C—C in FIG. 3 and arrows D—D in FIG.9, to conform with the placement of the vehicle visor against the interior roof surface 18, as shown in FIG. 11 or the windshield 20, as shown in FIG. 10. This flexibility feature is important because it allows the driver or user (not shown) to clip the sun spot 10 onto the vehicle visor 12 and then move the vehicle visor to any position desired without removing the sun spot and without cracking or damaging the sun spot. To accomplish this feature it is contemplated that a plasticizer (not shown) will be added to the plastic or polymeric material so as to cause the plastic or polymeric material to become "softer" and more rubbery in character.

In addition, the positioning of the clip means 24, 30 along the longitudinal axis 26, as shown in FIGS. 3, 7, and 9–11, also allows the sun spot 10 to be positioned and retained in an extended position 54, as shown in FIG. 12, on the vehicle visor 12 as the vehicle visor is placed against either the interior roof surface 18, as shown in FIG. 11 or the windshield 20, as shown in FIG. 10. The resiliently flexible injection molded shield member 22, 28 also further comprises the lower edge 56 and an outer surface 58, as shown in FIGS. 3,4, and 7–9. The lower edge is located on the longitudinal axis 26 opposite the clip means 24, 30 and the outer surface 58 tapers, arrow E, towards the longitudinal axis 26 from the clip means to the lower edge 56 to thereby provide the flexibly conforming capabilities (arrows C—C in FIG. 3 and arrows D—D in FIG. 9) of the resiliently flexible injection molded shield member. The resiliently flexible injection molded shield member 22, 28 flexibly conforms at an angle 60 between zero degrees and 70 degrees so as to flex or to bend to conform to the interior roof surface 18 or the windshield 20. In the preferred embodiment, the angle 60 is between 22 and 35 degrees and the resiliently flexible injection molded shield member has a thickness of 3/16 inch in a middle portion 62 and a thickness of 1/16 inch at the lower edge 56, hence showing the tapering feature, arrow E.

As to the resilient nature of the resiliently flexible injection molded shield member 22, 28 and due to the possible temperature fluctuations occurring inside of the vehicle 14, the resiliently flexible injection molded shield member being constructed for performing under temperature variations without materially failing. Material failure can result in cracking, breaking, and so forth. The materials and plasitcizer (not shown) chosen must provide for this important feature. In the preferred embodiment, the sun spot 10 will function within a temperature range from −30° F. to +130° F. because the temperature variations in the vehicle can vary to this degree between winter and summer. Therefore materials that can function within the temperature range should be chosen so as to allow the sun spot 10 to be used within the temperature variations without material failure.

The clip means 24, 30, shown in FIGS. 1–12 for the various embodiments, forms an integral part of the sun spot 10 and is injection molded together with the resiliently flexible injection molded shield member 22, 28 in the unibody construction or as the single-piece unit respectively. It is contemplated that standard synthetic injection molded processes known in the art will be used to construct the clip means and the resiliently flexible injection molded shield member. The clip means 24, 30 is also preferably constructed to be more rigid than the resiliently flexible injection molded shield member 22, 28.

In addition, the clip means 24, 30 further comprises a plurality of grips 64 for operating the clip means, as shown in FIGS. 1–12 for the various embodiments, and each grip of the plurality of grips has raised ridges 66 to aid in grasping the clip means. The clip means is constructed of a sufficiently rigid construction, in the injection molding process, so that pressure, arrow F in FIG. 3 and arrow G in FIG. 9, is required to operate the clip means and yet allow the clip means to be elastically flexible so as to open and grasp the vehicle visor 12. What is key is that the clip means 24, 30 be strong enough to stay attached to the vehicle visor once it is clipped to it. The clip means has teeth 68 along a mouth structure 70 for gripping, fastening, and retaining the sun spot 10 on the vehicle visor, as shown in FIGS. 3 and 9. In addition, in the preferred embodiment, the clip means has a width 72 sized one-third the diameter 38 of the resiliently flexible injection molded shield member 22, 28.

Another critical design feature shown in FIGS. 3, 9 and 12 is that the clip means 24, 30 is sized and configured to extend the resiliently flexible injection molded shield member 22, 28 in close proximity to the vehicle visor 12 to shield the glare passing around the peripheral edge 16 of the vehicle visor and to open and grasp varying vehicle visor thickness 74 and varying vehicle visor texture 76. The thickness of vehicle visors often vary between ¼ inch and ¾ inch and the texture can be of a hard board construction, a padded construction, and so forth. The clip means 24, 30 must be designed to fit around and grasp these thicknesses and textures.

In order to retain the clip means 24 on the various vehicle visors 12 in the embodiment shown in FIGS. 1–4, the clip means 24 is constructed of the sufficiently rigid materials and the teeth 68 and mouth structure 70 are designed so that the clip means 24 elastically responds when opened and grips the vehicle visor 12 throughout its use. In other embodiments, such as those shown in FIGS. 5–9, the spring means 32 is attached to the clip means 30 to cause the clip means to retain the single-piece resiliently flexible synthetic injection molded shield member 28 on the vehicle visor 12 before, during, and after usage of the vehicle visor and the single-piece resiliently flexible injection molded shield member. In the preferred embodiment, the spring means 32 is a compression spring.

The problems of the prior art are therefore overcome by our invention as the lightweight sun spot 10 provides a resilient, flexible glare shield capable of removable placement along the peripheral edge 16 of the vehicle visor 12 and capable of conformed placement against either the windshield 20 or the interior roof surface 18 of the vehicle 14. In addition, in other embodiments, clip means 24, 30 can be a clamp or clamp means and the clamp means can be capable of clamping action or scissor-like clamping action.

As various possible embodiments may be made in the above invention for use for different purposes and as various changes might be made in the embodiments and methods above set forth, it is understood that all of the above matters here set forth or shown in the accompanying drawings are to be interpreted as illustrative and not in a limiting sense.

We claim:

1. A sun spot for use as an extension on a vehicle visor of a vehicle having a peripheral edge and for use with an interior vehicle roof surface and a windshield, the sun spot comprising:

a single-piece resiliently flexible synthetic shield member being sized and proportioned for shielding glare without impairing visibility through the windshield, the single-piece resiliently flexible synthetic shield member having clip means peripherally extended from a portion of the single-piece resiliently flexible synthetic shield member for adjustably and removably placing the single-piece resiliently flexible synthetic shield member along the peripheral visor edge of the vehicle visor in approximate alignment with a longitudinal axis of the single-piece resiliently flexible synthetic shield member, the single-piece resiliently flexible synthetic shield member being flexible for conforming to the interior vehicle roof surface or the windshield when the vehicle visor is placed against the interior vehicle roof surface or the windshield respectively; and spring means attached to the clip means for causing the clip means to retain the single-piece resiliently flexible synthetic shield member on the vehicle visor before, during, and after usage of the vehicle visor and the single-piece resiliently flexible shield member, the clip means being structurally configured for connecting and detaching the sun spot to the vehicle visor as required.

2. The sun spot of claim 1, the single-piece resiliently flexible synthetic shield member further comprising a lower edge, an outer surface, and a geometrical shape, the lower edge being located on the longitudinal axis opposite the clip means, the outer surface tapering towards the longitudinal axis from the clip means to the lower edge for providing the flexibly conforming capabilities of the single-piece resiliently flexible synthetic shield member, the single-piece resiliently flexible synthetic shield member flexibly conforming at an angle between zero degrees and 70 degrees, the geometrical shape being shaped and proportioned for shielding the glare passing around the peripheral visor edge, the sun spot functioning within a temperature ranging from −30° F. to +130° F., the sun spot being of lightweight construction.

3. A sun spot for use as an extension on a vehicle visor of a vehicle having a peripheral edge and for use with an interior vehicle roof surface and a windshield, the sun spot comprising:

a single-piece resiliently flexible synthetic shield member being sized and proportioned for shielding glare without impairing visibility through the windshield, the single-piece resiliently flexible synthetic shield member having clip means peripherally extended from a portion of the single-piece resiliently flexible synthetic shield member for adjustably and removably placing the single-piece resiliently flexible synthetic shield member along the peripheral visor edge of the vehicle visor in approximate alignment with a longitudinal axis of the single-piece resiliently flexible synthetic shield member, the single-piece resiliently flexible synthetic shield member being flexible for conforming to the interior vehicle roof surface or the windshield when the vehicle visor is placed against the interior vehicle roof surface or the windshield respectively; and spring means attached to the clip means for causing the clip means to retain the single-piece resiliently flexible synthetic shield member on the vehicle visor before, during, and after usage of the vehicle visor and the single-piece resiliently flexible shield member, the clip means being structurally configured for connecting and detaching the sun spot to the vehicle visor as required, the single-piece resiliently flexible synthetic shield member further comprising a lower edge, an outer surface, and a geometrical shape, the lower edge being located on the longitudinal axis opposite the clip means, the outer surface tapering towards the longitudinal axis from the clip means to the lower edge for providing the flexibly conforming capabilities of the single-piece resiliently flexible synthetic shield member, the single-piece resiliently flexible synthetic shield member flexibly conforming at an angle between zero degrees and 70 degrees, the geometrical shape being shaped and proportioned for shielding the glare passing around the peripheral visor edge, the sun spot functioning within a temperature ranging from −30° F. to +130° F., the sun spot being of lightweight construction, the clip means further comprising a plurality of grips for operating the clip means, each grip of the plurality of grips having raised ridges for aiding in grasping the clip means, the clip means being sufficiently rigid for requiring pressure for operating the clip means, the clip means having teeth along a mouth structure for gripping, fastening, and retaining the sun spot on the vehicle visor, the clip means being sized and configured for extending the single-piece resiliently flexible synthetic shield member in close proximity to the vehicle visor for shielding the glare passing around the peripheral visor edge of the vehicle visor and for opening and grasping varying vehicle visor thickness and varying vehicle visor texture.

4. The sun spot of claim 3, wherein the geometrical shape is circular or rectangular and the spring means is a compression spring.

5. The sun spot of claim 4, wherein the single-piece resiliently flexible synthetic shield member is constructed of an opaque material.

6. The sun spot of claim 4, wherein the single-piece resiliently flexible synthetic shield member is constructed of a transparent material coated with a glare reducing agent.

7. The sun spot of claim 4, the single-piece resiliently flexible synthetic shield member further comprising an upper portion and a lower portion, the upper portion extending from the clip means towards the lower edge and the lower portion being located adjacent the upper portion and including the lower edge, the upper portion being constructed of an opaque material and the lower portion being constructed of a translucent material coated with a glare reducing agent or a transparent material coated with a glare reducing agent.

8. In combination, a sun spot for a vehicle having an interior roof surface and a windshield, the combination comprising:

a vehicle visor having a peripheral edge and being connected to the vehicle; and a resiliently flexible injection molded shield member of unibody construction having clip means peripherally extended from a portion of the resiliently flexible injection molded shield member for adjusting and removing placement of the sun spot along the peripheral edge of the vehicle visor in approximate alignment with a longitudinal axis of the resiliently flexible injection molded shield member, the resiliently flexible injection molded shield member being sized and proportioned for shielding glare without impairing visibility through the windshield, the resiliently flexible injection molded shield member for retaining on the vehicle visor while flexing for conforming the resiliently flexible injection molded shield member with the placement of the vehicle visor against the interior roof surface or the windshield.

9. In combination, a sun spot vehicle for a vehicle having an interior roof surface and a windshield, the combination comprising:

a vehicle visor having a peripheral edge and being connected to the vehicle; and a resiliently flexible injection molded shield member of unibody construction having clip means peripherally extended from a portion of the resiliently flexible injection molded shield member for adjusting and removing placement of the sun spot along the peripheral edge of the vehicle visor in approximate alignment with a longitudinal axis of the resiliently flexible injection molded shield member, the resiliently flexible injection molded shield member being sized and proportioned for shielding glare without impairing visibility through the windshield, the resiliently flexible injection molded shield member for retaining on the vehicle visor while flexing for conforming the resiliently flexible injection molded shield member with the placement of the vehicle visor against the interior roof surface or the windshield, the resiliently flexible injection molded shield member further comprising a lower edge, an outer surface, and a geometrical shape, the lower edge being located on the longitudinal axis opposite the clip means, the outer surface tapering towards the longitudinal axis from the clip means to the lower edge for providing the flexibly conforming capabilities of the resiliently flexible injection molded shield member, the resiliently flexible injection molded shield member flexibly conforming at an angle between zero degrees and 70 degrees, the geometrical shape being shaped and proportioned for shielding the glare passing around the peripheral edge of the vehicle visor, the sun spot functioning within a temperature ranging from −30° F. to +130° F., the sun spot being of lightweight construction, the clip means further comprising a plurality of grips for operating the clip means, each grip of the plurality of grips having raised ridges for aiding in grasping the clip means, the clip means being of a sufficiently rigid construction for requiring pressure for operating the clip means and yet being elastically flexible for opening and grasping the vehicle visor, the clip means having teeth along a mouth structure for gripping, fastening, and retaining the sun spot on the vehicle visor, the clip means being sized and configured for extending the resiliently flexible injection molded shield member in close proximity to the vehicle visor for shielding the glare passing around the peripheral edge of the vehicle visor and for opening and grasping varying vehicle visor thickness and varying vehicle visor texture.

10. The combination of claim 9, wherein the geometrical shape is circular or rectangular.

11. The combination of claim 10, wherein the resiliently flexible injection molded shield member is constructed of an opaque material.

12. The combination of claim 10, wherein the resiliently flexible injection molded shield member is constructed of a transparent material coated with a glare reducing agent.

13. The combination of claim 10, the resiliently flexible injection molded shield member further comprising an upper portion and a lower portion, the upper portion extending from the clip means towards the lower edge and the lower portion being located adjacent the upper portion and including the lower edge, the upper portion being constructed of an opaque material and the lower portion being constructed of a translucent material coated with a glare reducing agent or a transparent material coated with a glare reducing agent.

14. A sun spot for use as an extension on a vehicle visor of a vehicle, the vehicle visor having a peripheral edge, the vehicle having an interior roof surface and a windshield, the sun spot comprising:

a single-piece resiliently flexible injection molded shield member being sized, proportioned, and geometrically shaped for shielding glare under a temperature ranging from −30° F. to +130° F. without impairing visibility through the windshield, the single-piece resiliently flexible injection molded shield member having clip means peripherally extended from a portion of the single-piece resiliently flexible injection molded shield member for adjustably and removably placing the single-piece resiliently flexible injection molded shield member along the peripheral edge of the vehicle visor in approximate alignment with a longitudinal axis of the single-piece resiliently flexible injection molded shield member; and spring means attached to the clip means for retaining the single-piece resiliently flexible injection molded shield member on the vehicle visor before, during, and after usage of the vehicle visor and the single-piece resiliently flexible injection molded shield member, the single-piece resiliently flexible injection molded shield member flexibly conforming for placement against the interior roof surface or the windshield when the vehicle visor is placed against the interior roof surface or the windshield respectively.

15. The sun spot of claim 14, the single-piece resiliently flexible injection molded shield member further comprising a lower edge and an outer surface, the lower edge being located on the longitudinal axis opposite the clip means, the outer surface tapering towards the longitudinal axis from the clip means to the lower edge for providing the flexibly conforming capabilities of the single-piece resiliently flexible injection molded shield member, the clip means further comprising a plurality of grips for operating the clip means, each grip of the plurality of grips having raised ridges for aiding in grasping the clip means, the clip means having teeth along a mouth structure for gripping, fastening, and retaining the sun spot on the vehicle visor.

16. The sun spot of claim 15, wherein the clip means are sufficiently rigid for requiring pressure for operating the clip means, the clip means being sized and configured for extending the single-piece resiliently flexible injection molded shield member in close proximity to the vehicle visor for shielding the glare passing around the peripheral edge of the vehicle visor and for opening and grasping varying vehicle visor thickness and varying vehicle visor texture, the single-piece resiliently flexible injection molded shield member flexibly conforming at an angle between zero degrees and 70 degrees, the geometrical shape being shaped and proportioned for shielding the glare passing around the peripheral edge of the vehicle visor, the sun spot being of lightweight construction, the spring means being a compression spring.

17. The sun spot of claim 16, wherein the geometrical shape is circular or rectangular.

18. The sun spot of claim 16, wherein the single-piece resiliently flexible injection molded shield member is constructed of an opaque material.

19. The sun spot of claim 16, wherein the single-piece resiliently flexible injection molded shield member is constructed of a transparent material coated with a glare reducing agent, the glare reducing agent having a tint.

20. The sun spot of claim 16, the single-piece resiliently flexible injection molded shield member further comprising an upper portion and a lower portion, the upper portion extending from the clip means towards the lower edge and the lower portion being located adjacent the upper portion and including the lower edge, the upper portion being constructed of an opaque material and the lower portion being constructed of a translucent material coated with a glare reducing agent or a transparent material coated with a glare reducing agent, the glare reducing agent having a tint.

21. A sun spot for use as an extension on a vehicle visor of a vehicle, the vehicle having a peripheral edge, the vehicle having an interior roof surface and a windshield, the improvement comprising:

a single-piece resiliently flexible synthetic shield member being sized and proportioned for shielding glare without impairing visibility through the windshield, the single-piece resiliently flexible synthetic shield member having clip means peripherally extended from a portion of the single-piece resiliently flexible synthetic shield member for adjustably and removably placing the single-piece resiliently flexible synthetic shield member along the peripheral edge of the vehicle visor in approximate alignment with a longitudinal axis of the single-piece resiliently flexible synthetic shield member, the single-piece resiliently flexible synthetic shield member being constructed as one piece with the clip means, the clip means being structurally configured for optionally and releasably securing the sun spot to the vehicle visor as needed, the single-piece resiliently flexible synthetic shield member being flexible for conforming to the interior roof surface or the windshield when the vehicle visor is placed against the interior roof surface or the windshield respectively; and spring means attached to the clip means, the spring means being configured for causing the clip means to retain the single-piece resiliently flexible synthetic shield member on the vehicle visor before, during, and after usage of the vehicle visor and the single-piece resiliently flexible synthetic shield member.

* * * * *